US 9,135,915 B1

(12) United States Patent
Johnson et al.

(10) Patent No.: US 9,135,915 B1
(45) Date of Patent: Sep. 15, 2015

(54) AUGMENTING SPEECH SEGMENTATION AND RECOGNITION USING HEAD-MOUNTED VIBRATION AND/OR MOTION SENSORS

(75) Inventors: Michael Patrick Johnson, Sunnyvale, CA (US); Jianchun Dong, Palo Alto, CA (US); Mat Balez, San Francisco, CA (US)

(73) Assignee: Google Inc., Mountain View, CA (US)

( * ) Notice: Subject to any disclaimer, the term of this patent is extended or adjusted under 35 U.S.C. 154(b) by 108 days.

(21) Appl. No.: 13/559,544

(22) Filed: Jul. 26, 2012

(51) Int. Cl.
*G10L 19/00* (2013.01)
*G10L 21/00* (2013.01)
*G10L 21/02* (2013.01)
*G10L 15/00* (2013.01)
*G10L 15/20* (2006.01)
*G10L 25/00* (2013.01)
*H04R 3/00* (2006.01)
*H04R 25/00* (2006.01)
*G10L 15/26* (2006.01)

(52) U.S. Cl.
CPC ................................... *G10L 15/26* (2013.01)

(58) Field of Classification Search
CPC .. G11C 2207/16; G10L 19/005; G10L 15/22; G10L 15/20; G10L 15/265; G10L 21/0208; G10L 17/005; H04R 3/005; H04R 25/558
USPC ......... 704/261, 235, 231, 233, 201, 211, 223, 704/226, 275, 273, 228; 381/151, 318, 315, 381/92; 382/186
See application file for complete search history.

(56) References Cited

U.S. PATENT DOCUMENTS

| 7,383,181 | B2 | 6/2008 | Huang et al. | |
|---|---|---|---|---|
| 7,447,360 | B2 | 11/2008 | Liu et al. | |
| 7,496,387 | B2 | 2/2009 | Byford et al. | |
| 2009/0204410 | A1* | 8/2009 | Mozer et al. | 704/275 |
| 2009/0281809 | A1* | 11/2009 | Reuss | 704/273 |
| 2009/0287485 | A1* | 11/2009 | Glebe | 704/233 |

(Continued)

OTHER PUBLICATIONS

Henry et al., "Bone Conduction: Anatomy, Physiology, and Communication", May 2007, Technical Report ARL-TR-4138, Army Research Laboratory, available at http://www.dtic.mil/cgi-bin/GetTRDoc?AD=ADA468459&Location=U2&doc=GetTRDoc.pdf (last visited Jul. 26, 2012).

(Continued)

*Primary Examiner* — Pierre-Louis Desir
*Assistant Examiner* — Anne Thomas-Homescu
(74) *Attorney, Agent, or Firm* — McDonnell Boehnen Hulbert & Berghoff LLP

(57) ABSTRACT

Example methods and systems use multiple sensors to determine whether a speaker is speaking. Audio data in an audio-channel speech band detected by a microphone can be received. Vibration data in a vibration-channel speech band representative of vibrations detected by a sensor other than the microphone can be received. The microphone and the sensor can be associated with a head-mountable device (HMD). It is determined whether the audio data is causally related to the vibration data. If the audio data and the vibration data are causally related, an indication can be generated that the audio data contains HMD-wearer speech. Causally related audio and vibration data can be used to increase accuracy of text transcription of the HMD-wearer speech. If the audio data and the vibration data are not causally related, an indication can be generated that the audio data does not contain HMD-wearer speech.

20 Claims, 10 Drawing Sheets

(56) References Cited

U.S. PATENT DOCUMENTS

| | | | |
|---|---|---|---|
| 2011/0010172 A1 | 1/2011 | Konchitsky | |
| 2011/0288860 A1 | 11/2011 | Schevciw | |
| 2012/0059648 A1* | 3/2012 | Burnett et al. | 704/226 |
| 2012/0197635 A1* | 8/2012 | Nystrom | 704/201 |
| 2012/0209601 A1* | 8/2012 | Jing | 704/226 |
| 2012/0209603 A1* | 8/2012 | Jing | 704/233 |
| 2012/0264091 A1* | 10/2012 | Huber et al. | 434/185 |
| 2012/0278070 A1* | 11/2012 | Herve et al. | 704/226 |
| 2012/0284022 A1* | 11/2012 | Konchitsky | 704/231 |
| 2012/0310637 A1* | 12/2012 | Vitte et al. | 704/226 |
| 2013/0043977 A1* | 2/2013 | Velius et al. | 340/5.84 |
| 2013/0246062 A1* | 9/2013 | Avargel et al. | 704/233 |
| 2013/0287224 A1* | 10/2013 | Nystrom et al. | 381/92 |
| 2013/0343585 A1* | 12/2013 | Bennett et al. | 381/315 |
| 2014/0029762 A1* | 1/2014 | Xie et al. | 381/94.1 |

OTHER PUBLICATIONS

Henry et al., "Comparsion of Bone-Conduction Technologies", Jan. 2009, Technical Report ARL-TR-4705, Army Research Laboratory, available at http://www.dtic.mil/cgi-bin/GetTRDoc?AD=ADA499561 (last visited Jul. 26, 2012).

Ikerus (Ed.), "Signal Conditioning", Jun. 15, 2012, Wikimedia Foundation, available at http://en.wikipedia.org/w/index.php?title=Signal_conditioning&oldid=497756285 (last visited Jul. 26, 2012).

* cited by examiner

AUGMENTING SPEECH SEGMENTATION AND RECOGNITION USING HEAD-MOUNTED VIBRATION AND/OR MOTION SENSORS

BACKGROUND

Unless otherwise indicated herein, the materials described in this section are not prior art to the claims in this application and are not admitted to be prior art by inclusion in this section.

Computing devices such as personal computers, laptop computers, tablet computers, cellular phones, and countless types of Internet-capable devices are increasingly prevalent in numerous aspects of modern life. Over time, the manner in which these devices are providing information to users is becoming more intelligent, more efficient, more intuitive, and/or less obtrusive.

The trend toward miniaturization of computing hardware, peripherals, as well as of sensors, detectors, and image and audio processors, among other technologies, has helped open up a field sometimes referred to as "wearable computing." In the area of image and visual processing and production, in particular, it has become possible to consider wearable displays that place a very small image display element close enough to a wearer's (or user's) eye(s) such that the displayed image fills or nearly fills the field of view, and appears as a normal sized image such as displayed on a traditional image display device. In some configurations, wearable computers can receive inputs from input devices, such as keyboards, computer mice, touch pads, and buttons. In other configurations, wearable computers can accept speech inputs as well or instead via voice interfaces.

Emerging uses of wearable displays include applications in which users interact in real time with an augmented or virtual reality. Such applications can be mission-critical, such as in a public safety or aviation setting, or recreational, such as interactive gaming.

SUMMARY

In one aspect, an example method can include: (a) receiving audio data representative of audio detected by a microphone, where the microphone is communicatively coupled to a head-mountable device (HMD), and where the received audio data can include audio data in an audio-channel speech band, (b) receiving vibration data representative of vibrations detected by a sensor other than the microphone, where the sensor is communicatively coupled to the HMD, and where the received vibration data includes vibration data in a vibration-channel speech band, (c) determining whether the audio data in the audio-channel speech band is causally related to the vibration data in the vibration-channel speech band, (d) in response to determining that the audio data in the audio-channel speech band is causally related to the vibration data in the vibration-channel speech band, generating an indication that the audio data contains HMD-wearer speech, and (e) in response to determining that the audio data in the audio-channel speech band is not causally related to the vibration data in the vibration-channel speech band, generating an indication that the audio data does not contain HMD-wearer speech.

In another aspect, a HMD can include a processor, a microphone, a sensor, a non-transitory computer-readable medium and program instructions stored on the non-transitory computer-readable medium. The program instructions are executable by the processor to cause the HMD to perform functions. The functions can include: (a) receiving audio data representative of audio detected by the microphone, where the received audio data can include audio data in an audio-channel speech band, (b) receiving vibration data representative of vibrations detected by the sensor, and where the received vibration data includes vibration data in a vibration-channel speech band, (c) determining whether the audio data in the audio-channel speech band is causally related to the vibration data in the vibration-channel speech band, (d) in response to determining that the audio data in the audio-channel speech band is causally related to the vibration data in the vibration-channel speech band, generating an indication that the audio data contains HMD-wearer speech, and (e) in response to determining that the audio data in the audio-channel speech band is not causally related to the vibration data in the vibration-channel speech band, generating an indication that the audio data does not contain HMD-wearer speech.

In yet another aspect, an article of manufacture can include a non-transitory computer-readable medium having instructions stored thereon that, when executed by a computing device, cause the computing device to perform functions. The functions can include: (a) receiving audio data representative of audio detected by a microphone communicatively coupled to a head-mountable display (HMD), where the received audio data can include audio data in an audio-channel speech band, (b) receiving vibration data representative of vibrations detected by a sensor communicatively coupled to the HMD, where the received vibration data includes vibration data in a vibration-channel speech band, (c) determining whether the audio data in the audio-channel speech band is causally related to the vibration data in the vibration-channel speech band, (d) in response to determining that the audio data in the audio-channel speech band is causally related to the vibration data in the vibration-channel speech band, generating an indication that the audio data contains HMD-wearer speech, and (e) in response to determining that the audio data in the audio-channel speech band is not causally related to the vibration data in the vibration-channel speech band, generating an indication that the audio data does not contain HMD-wearer speech.

These as well as other aspects, advantages, and alternatives, will become apparent to those of ordinary skill in the art by reading the following detailed description, with reference where appropriate to the accompanying drawings.

DETAILED DESCRIPTION

Introduction

Figure 1:
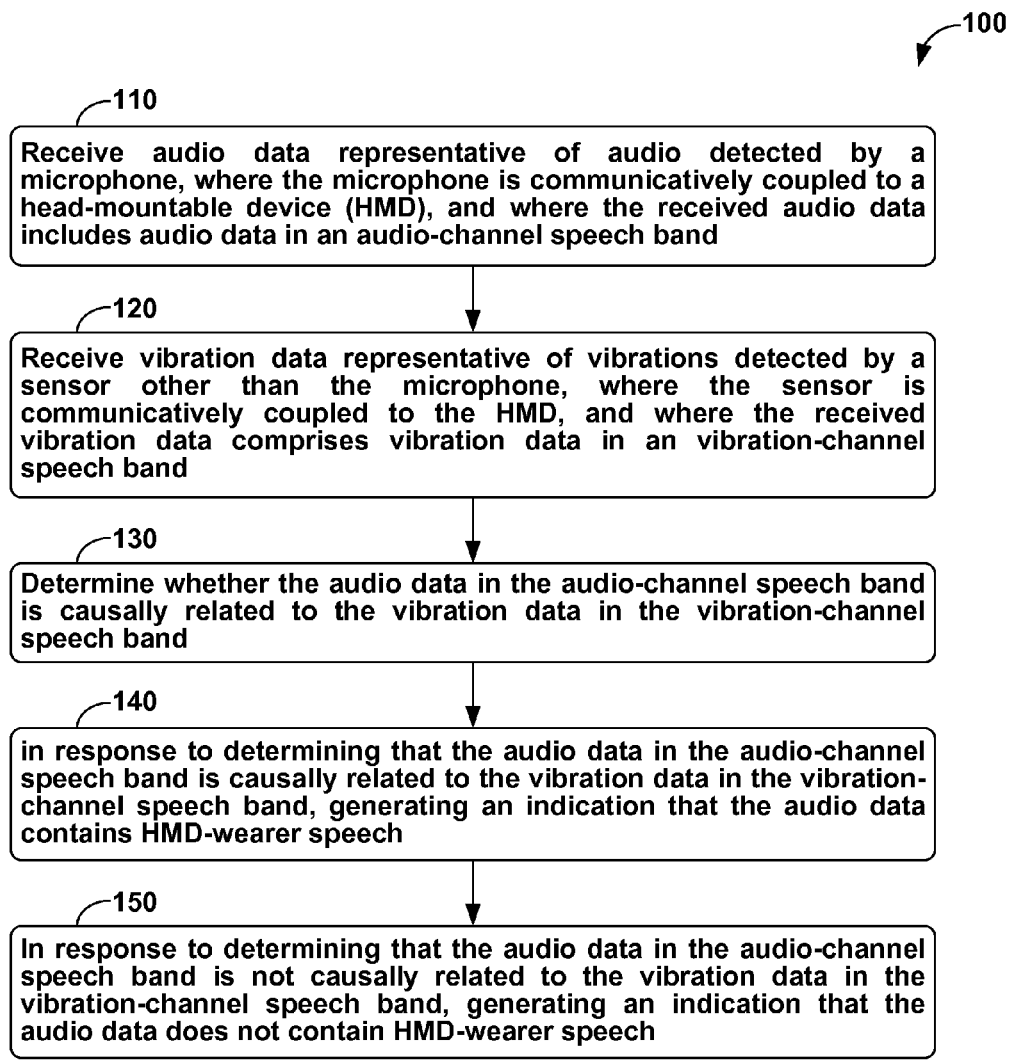
FIG. 1 is a flow chart illustrating a method, according to an example embodiment.

One problem that can be encountered in using a voice interface is a "voice segmentation problem", which is a problem of determining when to activate and deactivate the voice interface of a wearable device, such as a HMD. The voice segmentation problem involves determining how to segment speech (or other audio information) into a portion of speech which is directed to a speech recognition system of the voice interface and a portion of speech that is directed to other people.

A partial solution involves listening to an "audio channel", such as audio data provided by a microphone, for the presence or absence of the audio data, and activating the voice interface when audio data is present. However, the microphone can provide audio data for sounds unrelated to speech and/or for speech from person(s) other than a wearer of the HMD.

In a more complete solution, the HMD can be equipped with additional sensors, such as accelerometers and bone-conducting microphones (BCMs) that can detect vibrations related to movement and/or sounds emitted by the wearer. These sensors can generate a "vibration channel" with vibration data that can be used to evaluate whether the audio channel is carrying audio data corresponding to speech by the wearer.

For example, the HMD and/or other computing device(s) can correlate vibration data from the vibration channel with the audio data from the audio channel. Correlation can involve determining amount(s) of time, if any, between when audio data is received in the audio channel and corresponding vibration data is received in the vibration channel. For example, as sound generally moves faster through solid objects than air, a BCM may generate vibration data before a microphone generates audio data. As another example, the BCM may be placed farther away from a source of speech (e.g., the wearer's mouth) than the microphone, and so vibration data may lag behind audio data.

The HMD and/or other computing device(s) can use both the audio data and the vibration data to determine whether or not the audio data is HMD-wearer speech. After the audio channel and vibration channel are correlated in time, audio data in one or more "audio ranges", or frequency ranges related to the audio channel, can be compared with vibration data in one or more "vibration ranges", or frequency ranges related to the vibration channel. If the audio data in an audio range is coherent with, or matches, the vibration data in a vibration range corresponding to the audio range, the audio data and the vibration data can be causally related. Audio data causally related to vibration data can be classified as containing HMD-wearer speech. Otherwise, as the audio data in the audio range is not coherent with the vibration data in the corresponding vibration range, and thus the audio data and the vibration data may not be causally related. In this event, the audio data can be classified as not containing HMD-wearer speech.

After making the determination that the audio data does or does not contain HMD-wearer speech, the HMD and/or other computing device(s) can perform various actions. Once audio data has been classified as either containing HMD-wearer speech or not containing HMD-wearer speech, an indication that the audio data is or is not HMD-wearer speech can be generated and sent, perhaps to the voice interface. Thus, the voice interface could be activated in response an indication of HMD-wearer speech and/or deactivated in response to an indication of not HMD-wearer speech.

In other embodiments, the audio data can be filtered by providing it to the voice interface only if the audio data is classified as HMD-wearer speech. Then, the voice interface can process all received audio data as HMD-wearer speech. In still other embodiments, the audio data and/or vibration data corresponding to speech can be provided to an automatic speech recognizer (ASR), which may be part of the voice interface, to convert the speech to text. The audio data and/or vibration data can be conditioned based on the classification of wearer speech or not-wearer speech. For example, audio data corresponding to wearer speech can be amplified, while audio data corresponding to not-wearer speech can be diminished or removed from the audio channel. Other examples are possible as well.

These techniques for determining whether audio data is or is not wearer speech can enhance voice interface use by more accurately determining when to activate the voice interface. Also, as audio data is identified as being from the HMD-wearer or not, the HMD can be configured to be unresponsive to voice commands uttered by a non-HMD wearer. Further, as audio and vibration data are identified as data related to wearer speech or not-wearer speech, these data can be conditioned based on this classification, perhaps aiding the voice interface in processing wearer speech.

Example Operations

FIG. 1 is a flow chart illustrating method 100, according to an example embodiment. Example method 100 can determine if a speaker is speaking based on data from an audio channel, which can include audio data captured by one or more microphones, and a vibration channel, which can include vibration data captured from sensor(s) other than a microphone, such as accelerometer(s), BCM(s), and/or other sensors other than microphones. Part or all of method 100 can be performed using a computing device, such as computing device 902, and/or using a HMD, such as HMD 200, 602, 702, and/or 802.

Method 100 begins at block 110, where audio data representative of audio detected by a microphone can be received. The microphone can be communicatively coupled to a HMD. The received audio data can include audio data in an audio-channel speech band.

At block 120, vibration data representative of vibrations detected by a sensor other than the microphone can be received. The sensor can be communicatively coupled to the HMD. The received vibration data can include vibration data in a vibration-channel speech band. In some embodiments, the sensor can include an accelerometer and/or a BCM.

At block 130, the audio data in the audio-channel speech band can be determined to be causally related with the vibration data in the vibration-channel speech band.

At block 140, in response to determining that the audio data in the audio-channel speech band is causally related with the vibration data in the vibration-channel speech band, an indication that the audio data contains HMD-wearer speech can be generated.

At block 150, in response to determining that the audio data in the audio-channel speech band is not causally related with the vibration data in the vibration-channel speech band, an indication that the audio data does not contain HMD-wearer speech can be generated.

In some embodiments, method 100 can include determining a correlation delay between the microphone and the sensor. In other embodiments, method 100 can include, in response to the indication that the audio data contains HMD-wearer speech, providing at least the audio data to a speech recognizer. In still other embodiments, in response to the indication that the audio data contains HMD-wearer speech, providing the audio data and the vibration data to a speech recognizer. For example, the speech recognizer can use the audio data and the vibration data to recognize and/or segment speech in the audio data. In particular of these embodiments, the speech recognizer can recognize text corresponding to the HMD-wearer speech in the audio data and the vibration data. In more particular embodiments, the speech recognizer can generated an output that includes at least some of the recognized text.

In even other embodiments, method 100 can include: in response to the indication that the audio data does contain HMD-wearer speech, conditioning the audio data and/or vibration data as speech, and in response to the indication that the audio data does not contain HMD-wearer speech, conditioning the audio data and/or vibration data as non-speech.

An Example Head-Mountable Device

Figure 2:
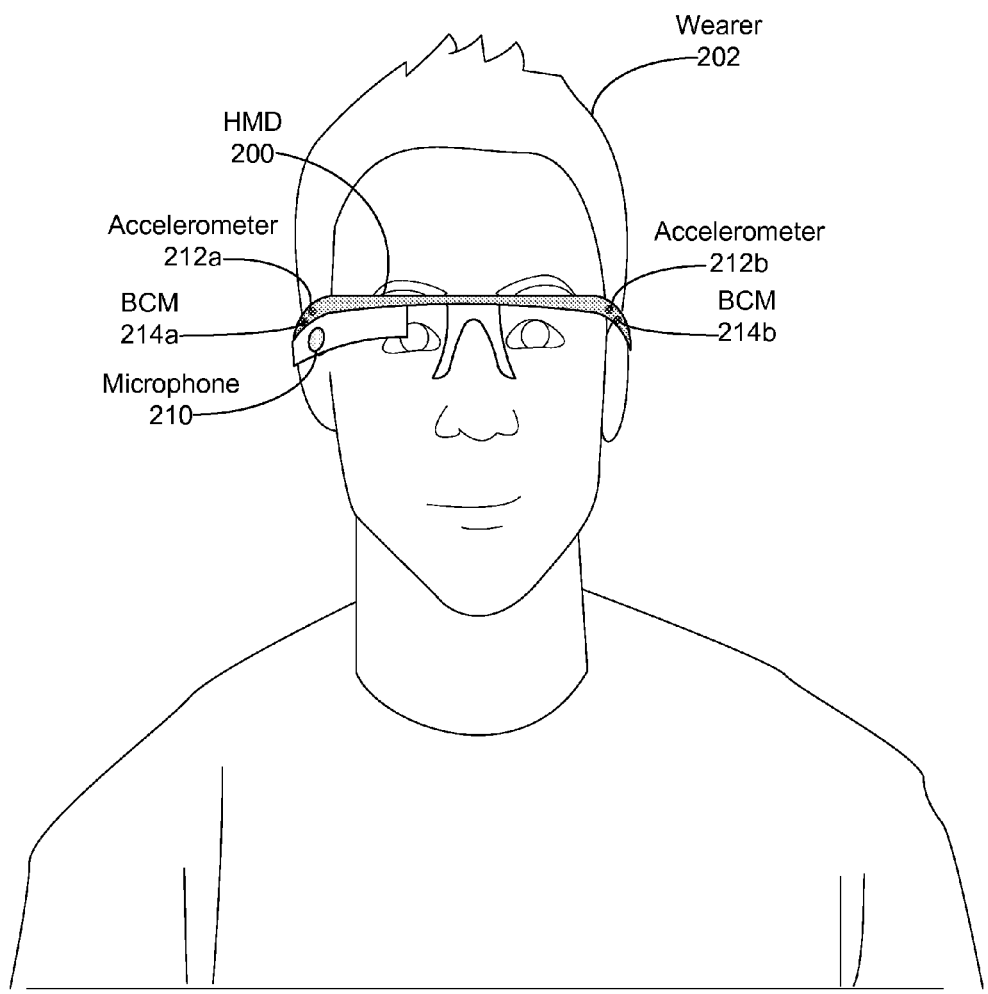
FIG. 2 shows an example wearable computing device configured as a head-mountable device (HMD) being worn by a wearer, according to an example embodiment.

FIG. 2 shows an example wearable computing device configured as a HMD 200 being worn by a wearer 202, according to an example embodiment. HMD 200 includes a microphone 210, two accelerometers 212a, 212b, and two bone-conduction microphones (BCMs) 214a, 214b. Microphone 210 can detect sounds uttered by wearer 202 and convert the sounds into electrical signals. Those signals can be recorded in a memory of HMD 200 and/or transmitted by HMD 200 to one or more other devices.

When accelerometers 212a, 212b are worn as shown in FIG. 2, the accelerometers 212a, 212b can pick up vibrations while walking, arm motion vibrations, and in some embodiments, vibrations during speech caused by a moving jawbone of a speaker. Similarly, BCMs 214a, 214b can detect vibrations of uttered speech as the vibrations travel through the jawbone and skull of a wearer. In some embodiments, more or less than one microphone, two accelerometers, and/or two BCMs can be utilized with HMD 200. In other embodiments, other sensors such as gyroscope(s) and/or magnetometer(s) can accompany and/or replace accelerometers 212a, 212b and/or BCMs 214a, 214b.

Figure 3:
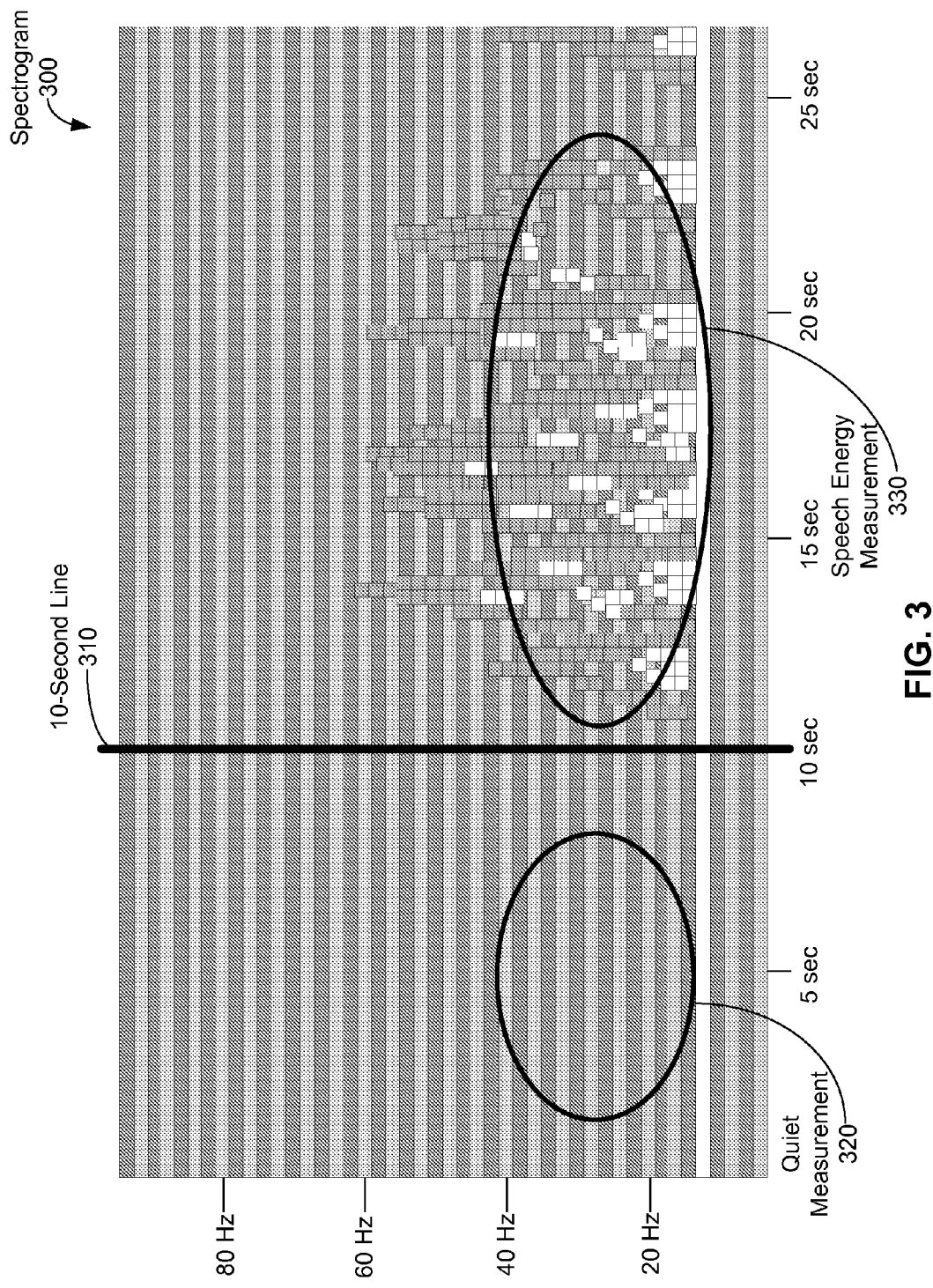
FIG. 3 depicts example spectral energy levels on a spectrogram, according to an example embodiment.

FIG. 3 depicts example spectral energy levels on spectrogram 300, according to an example embodiment. The spectral energy levels on spectrogram 300 represent measurements taken by an accelerometer of a person reading quietly for about 10 seconds and then speaking.

Spectrogram 300 has a horizontal or X axis with time in seconds and a vertical or Y axis with frequencies in Hertz (Hz). The time range reflected by spectrogram 300 is from 0 to about 26 seconds, and the frequency range reflected by spectrogram 300 is from 0 to 94 Hz.

Prior to 10-second line 310, that is while the person was reading, spectrogram 300 does not show much if any spectral energy. In particular, in quiet measurement region 310 regarding an approximate "speech energy band" of 20-40 Hz prior to the 10 second mark, no energy measurements are shown in FIG. 3. In contrast, after the 10 second mark, particularly as shown in speech energy measurement region 330, FIG. 3 shows that energy was recorded by the accelerometer for about 10 seconds in the speech energy band while the person was speaking. In other scenarios, vibrations in the 20-40 Hz speech energy band and/or other speech energy bands detected by an accelerometer could be generated from speech, but possibly from other sources, such as jawbone and/or skull movement while eating, chewing gum, and/or other activities.

Similarly, a BCM can capture vibrations through bones of the body and determine if energy is in a speech energy band for the BCM, and if so, determine that the speaker may be speaking. However, as with an accelerometer, energy detected in BCM speech energy bands can be caused by other sources than speech spoken by the wearer of the HMD; e.g., loud nearby music, very close other speakers (e.g., a baby babbling while being held by the speaker), and/or from other sources.

To determine if a wearer of a computing device is speaking, such as wearer 202 of HMD 200, data from multiple sources can be examined for coherency. Audio data can be recorded by a microphone, such as microphone 210, and vibration data can be gathered from other sensors, such as accelerometers 212a, 212b, and/or BCMs 214a, 214b. These data can first be correlated, or aligned in time. For example, speech travels through bone considerably faster than through air (e.g., sound travels 5-10 times faster through bone than through air), so signals related to speech by the speaker may be received at a BCM prior to being received at a microphone.

Correlation delay(s) between BCM and/or accelerometer measurements and microphone measurements can be determined. Similarly, correlation delays between accelerometer measurements and microphone measurements can be determined, as well as or instead of determining correlation delays between various sensors, such as accelerometers and BCMs. These correlation delays may be roughly constant in most scenarios. However, in other scenarios, correlation delays may vary, and so may have to be determined on a per HMD basis, periodically in time, and/or on some other basis (e.g., at the start of each session of speech).

Then, for the microphone and each other sensor, energy in one or more speech energy bands may or may not be detected. The speech energy bands can vary depending on the sensor or, in some cases, can be constant for all sensors; e.g., when a speaker is speaking, all sensors may record energy in the 20-40 Hz band such as shown by graph 300 in FIG. 3.

Assuming energy is detected in speech band(s) for the microphone and for all other sensor(s), the energy in the microphone's speech band(s) and other sensor(s)' speech bands can be tested for coherency. A first speech band and a second speech band have coherent data if a wave corresponding to the data in the first speech band is spectrally coherent, or has the same pattern of frequencies within the band, to a wave corresponding to the data in the second speech band. In some embodiments, the first and second speech bands can have coherent data as long as the first and second speech bands are spectrally coherent based on a threshold degree of spectral coherence. For example, let T=the threshold degree of spectral coherence, with $0 \leq T \leq 1$, and C(S1,S2) be a degree of spectral coherence determined between speech bands S1 and S2, with $0 \leq C(S1,S2) \leq 1$. Then, if C(S1,S2) is greater than or equal to T, speech band S1 can be considered as having coherent data with speech band S2.

An Example Method for Determining that an HMD-Wearer is Speaking

Figure 4:
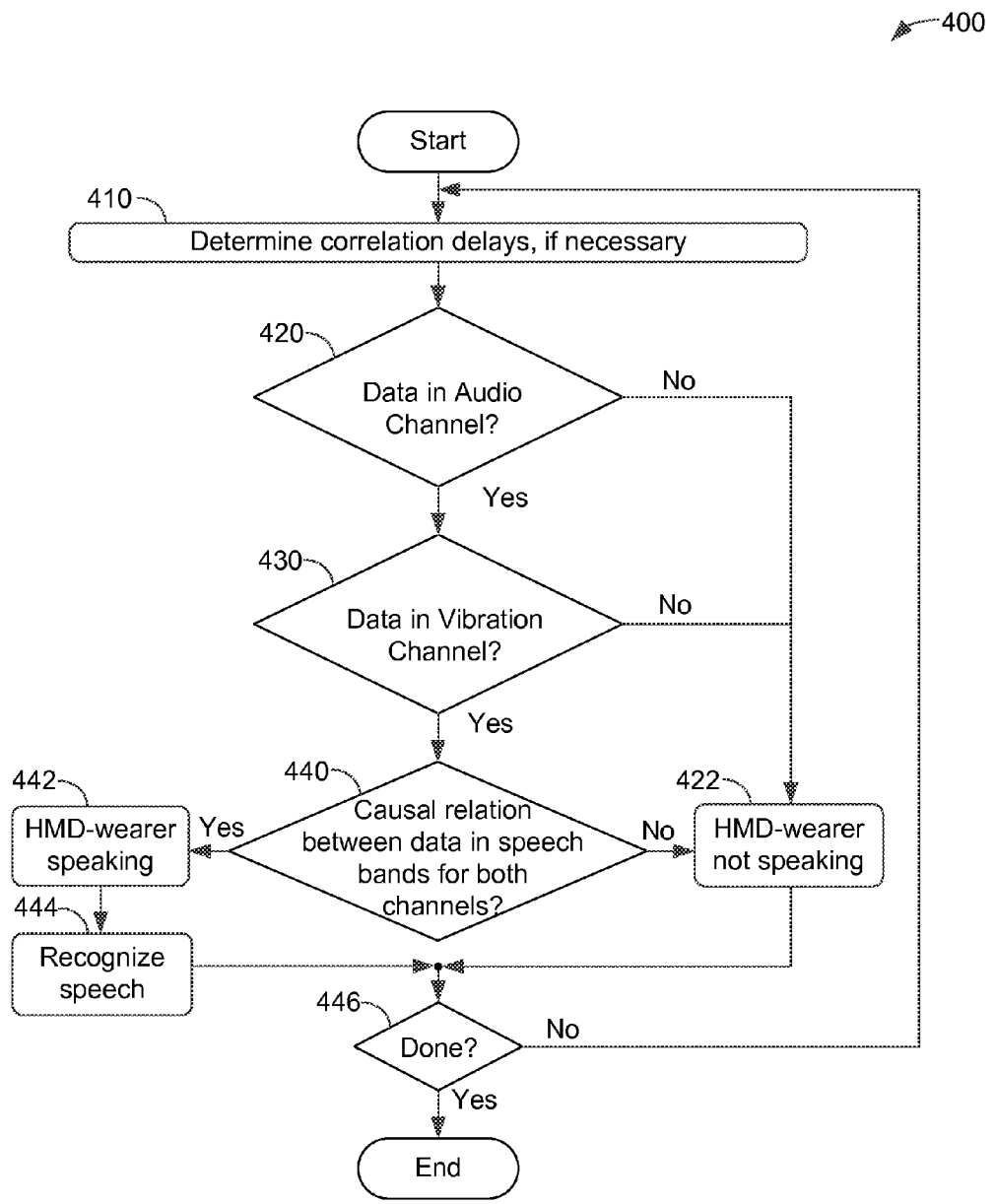
FIG. 4 is a flow chart illustrating another method, according to an example embodiment.

FIG. 4 shows an example method 400 for determining whether an HMD wearer is speaking based on an audio channel that includes data captured by microphone(s), and a vibration channel that includes data captured from sensor(s) other than a microphone, such as but not limited to accelerometer(s), BCM(s), gyroscope(s), and/or magnetometer(s). Part or all of method 400 can be performed using a computing device, such as computing device 902, and/or using a HMD, such as HMD 200, 602, 702, and/or 802.

Method 400 begins at block 410, where correlation delays between microphone(s) used for the audio channel and other sensor(s) used for the vibration channel can be determined, if necessary. Correlation delays may have to be determined on a per HMD basis, periodically in time, and/or on some other basis (e.g., at the start of each session of speech). In some other scenarios, correlation delays may be roughly constant and thus can be determined once and stored for reuse.

At block 420, a determination is made as to whether there is data in the audio channel. If there is no data in the audio channel, method 400 can proceed to block 422, while if there is data in the audio channel, method 400 can proceed to block 430.

At block 422, a determination is made that the HMD-wearer is not speaking. After making this determination, method 400 can proceed to block 446.

At block 430, a determination is made as to whether there is data in the vibration channel. This determination can be made after taking any correlation delay(s) between the microphone(s) generating audio channel data and the sensor(s) generating vibration channel data. If there is no data in the vibration channel, method 400 can proceed to block 422, while if there is data in the vibration channel, method 400 can proceed to block 440.

At block 440, a determination is made as to whether or not there is a causal relation between data in the speech band(s) of both the audio and vibration channels. In this context, a causal relationship indicates that both audio and vibration data are being generated from the same source. One technique for determining whether or not the causal relationship between the audio data and vibration data exists is to determine that there is coherent data in the speech band(s) of both the audio and vibration channels. This determination can be made using spectral coherency, perhaps based on a threshold degree of spectral coherency as discussed above. If there is coherent data in the speech band(s) of both the audio and vibration channels, then a causal relationship can be inferred between the audio and vibration channels and/or between the audio data and the vibration data.

Other techniques, such as but not limited to correlation, Bayesian networks, statistical inference techniques, and/or experimental techniques, can be used infer whether causal relation exists between data in the speech band(s) of both channels. If there is a causal relation between data in the speech band(s) of both channels, method 400 can proceed to block 442; otherwise, method 400 can proceed to block 422.

At block 442, a determination is made that the HMD-wearer is speaking.

At block 444, the audio channel data can be provided as a speech input for recognition, perhaps by a voice interface and/or an ASR process. The ASR process can then attempt recognize the speech and return text and/or other data corresponding to audio channel data. In some embodiments, some or all of the data in the vibration channel is provided to the ASR process, either with the speech data (e.g., the audio and vibration channels can be combined) or as an input separate from the audio channel. The ASR process may be resident on HMD 100 or may be partially or completely resident on one or more other computing devices; e.g., speech recognition server(s). In some embodiments, the ASR process can determine one or more features from the vibration data and/or use the vibration data to (assist in) segmenting audio data. Additional uses for vibration data in ASR are possible as well.

At block 446, a determination is made as to whether or not processing for method 400 is done. If the processing for method 400 is done, method 400 ends. Otherwise, method 400 can proceed to block 410.

An Example Speech Frequency Range Chart

Figure 5A:
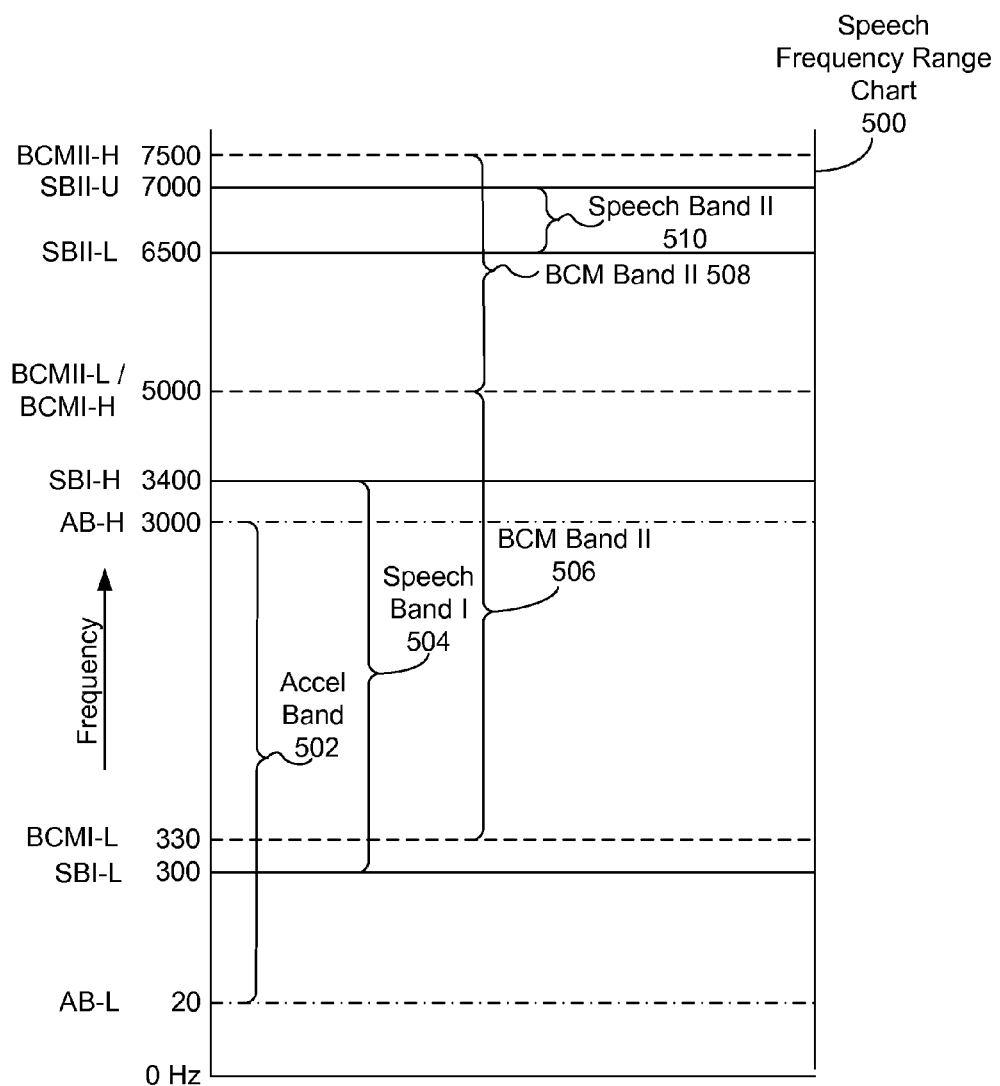
FIG. 5A depicts a speech frequency range chart, according to an example embodiment.

FIG. 5A depicts speech frequency range chart 500, according to an example embodiment. Frequencies increase from 0 Hz at the bottom of chart 500 to 7000 Hz at the top of chart 500. Frequency ranges shown in FIG. 5A are shown to ensure readability, rather than necessarily being drawn to scale.

Chart 500 displays a number of frequency bands. Accelerometer band 502, which is the lowest frequency band of chart 500 ranges from a low frequency of "Acceleration Band—Low" (AB-L) to a high frequency of "Acceleration Band—High" (AB-H) and is shown in FIG. 5A using dotted/dashed lines. In one example, accelerometer band 502 can be based on data captured by one or more accelerometers measuring vibration data, such as jaw and/or head movements, made during speech. In this example, accelerometer band 502 can range from an AB-L value of approximately 20 Hz to an AB-H value of approximately 3000 Hz. In other scenarios, multiple and/or different accelerometer band(s) associated with speech can be determined and displayed in chart 500.

FIG. 5A shows chart 500 with Speech Band I 504 ranging from a low frequency of "Speech Band I —Low" (SBI-L) to a high frequency of "Speech Band I—High" (SBI-H) using solid lines. Chart 500 also shows Speech Band II 510 ranging from a low frequency of "Speech Band II—Low" (SBII-L) to a high frequency of "Speech Band II—High" (SBI-H) using solid lines. In one example, Speech Band I 504 and/or Speech Band II 510 can be based on data captured by one or more microphones capturing audio data.

Human speech can be emitted at a fundamental frequency ($F_0$) and one or more harmonic tones. For example, $F_0$ for adult males ranges from about 80 Hz to about 160 Hz, $F_0$ for adult females ranges from about 150 Hz to about 250 Hz, and $F_0$ ranges from about 250 Hz to at least 300 Hz for children. Harmonic tones frequencies are integer multiples of $F_0$; e.g., $2F_0$, $3F_0$, and so on. So, for speech emitted with $F_0$=200 Hz, harmonic tones at 400 Hz, 600 Hz, 800 Hz, 1000 Hz, and so on can be emitted as part of the speech. In a common application for speech, telephony, speech in the range from 300 Hz to 3400 Hz can be captured in one voice band.

In the example shown in FIG. 5A, a second speech band, Speech Band II 510, can be captured as well, perhaps as an artifact of the microphone used to capture audio data. In the example shown in FIG. 5A, Speech Band I 504 can range from an SBI-L value of approximately 300 Hz to an SBI-H value of approximately 3400 Hz, and Speech Band II 510 can range from and SBII-L value of approximately 6500 Hz to an SBII-H value of approximately 7000 Hz. In other scenarios, more, fewer, and/or different speech band(s) can be determined and displayed in chart 500.

FIG. 5A shows chart 500 with BCM Band I 506 ranging from a low frequency of "BCM I—Low" (BCMI-L) to a high frequency of "BCM Band I—High" (BCMI-H) using dashed lines. Chart 500 also shows BCM Band II 508 ranging from a low frequency of "BCM II—Low" (BCMII-L) to a high frequency of "BCM Band II—High" (BCMII-H) using dashed lines, where BCMI-H equals BCMII-L. In one example, BCM Band I 506 and/or BCM Band II 508 can be based on data captured by one or more bone conducting microphones capturing vibration data, such as sound vibrations related to speech that have been conducted through a body of a wearer of an HMD and captured by one or more bone conducting microphones.

BCMs can provide reasonable amplification in frequencies ranging from about 300 Hz to 5,000 Hz and beyond, depending on the specific BCM. In the example shown in FIG. 5A, BCM Band I 506 can range from a BCMI-L value of approximately 330 Hz to a BCMI-H value of approximately 5000 Hz, and BCM Band I 506 can range from a BCMII-L value of approximately 5000 Hz to a BCMII-H value of approximately 7500 Hz. In other scenarios, more, fewer, and/or different BCM band(s) can be determined and displayed in chart 500.

In the example shown in FIG. 5A, Accelerometer Band 502, Speech Band I 504, and BCM Band I 506 can be correlated for speech coherency, and thus for causal relationships, and BCM Band II 508 and Speech Band II 510 can be correlated for speech coherency. Then, a causal relationship between the data in the audio and vibration channels can be inferred when the audio and vibration data are correlated and found to be coherent. In other scenarios, other combination(s) of speech and vibration bands can be correlated for speech coherency and/or causal relationships.

An Example Method for Conditioning Frequency Ranges

Figure 5B:
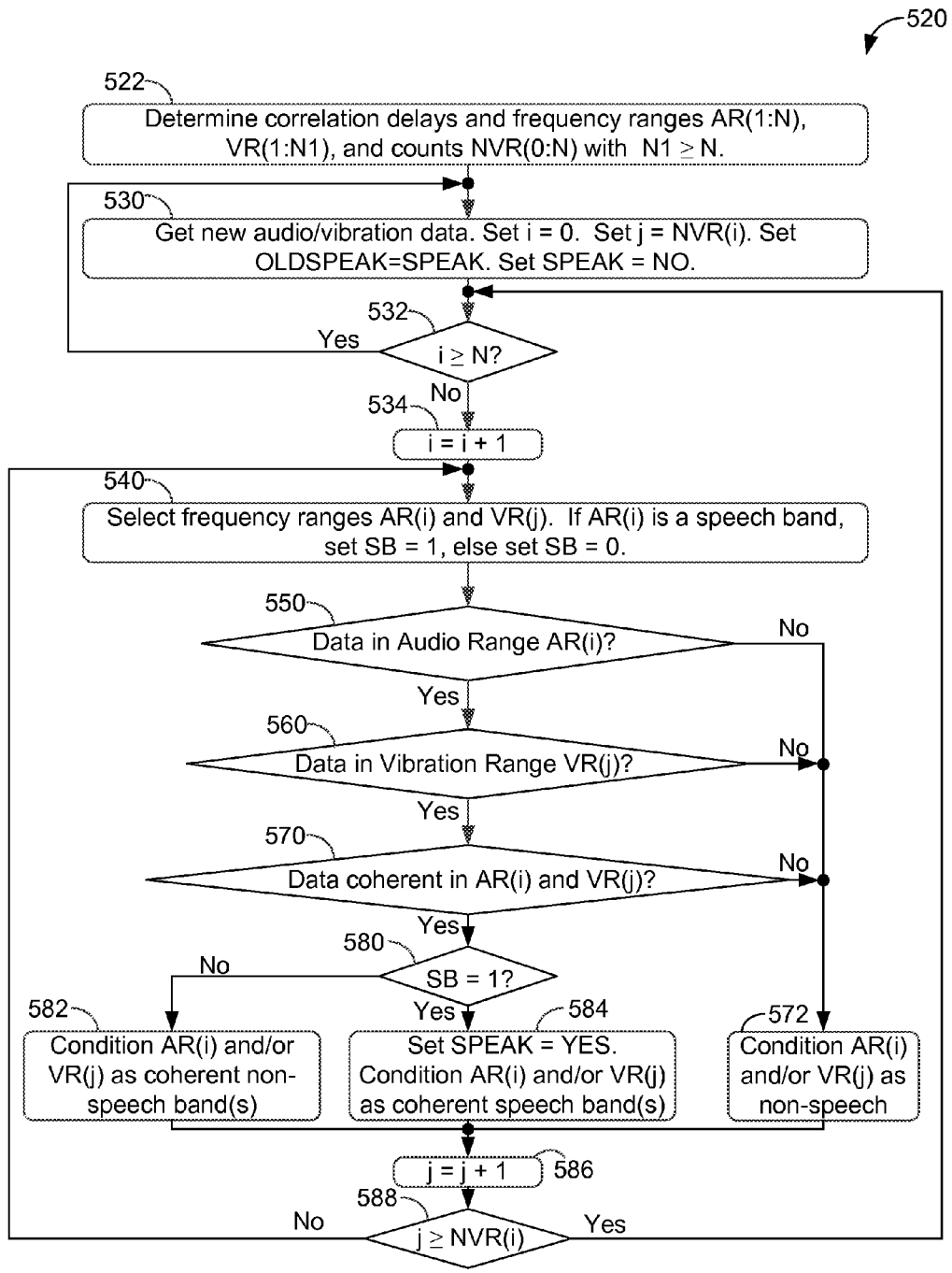
FIG. 5B is a flow chart illustrating yet another method, according to an example embodiment.

FIG. 5B shows an example method 520 for determining whether an HMD wearer is speaking based on one or more audio channels that include data captured by microphone(s), and one or more vibration channels that include data captured from sensor(s) other than a microphone, such as accelerometer(s), BCM(s), and/or other sensors other than microphones. Part or all of method 520 can be performed using a computing device, such as computing device 902, and/or using a HMD, such as HMD 200, 602, 702, and/or 802.

Method 520 uses the integer variable N to store the number of audio channels, the integer variable N1 to store the number of vibration channels with N>0 and N1≥N, the array of frequency ranges AR(1:N) to indicate the frequency ranges used for audio channels, the array of frequency ranges VR(1:n1) to indicate the frequency ranges used for vibration channels, and the array of integers NVR(O:N) to indicate which vibration channels used for a given audio channel. The nomenclature A(x:y) for an array indicates that the array A has elements that range from x to y inclusive; e.g., A(2:5) indicates array A has four elements: A(2), A(3), A(4), A(5).

Using the example of chart 500, N=2, and AR( )={(300, 3400), (6500, 7000)}, N1=4, and VR={(20, 60), (330,5 000), (20, 60), (5000, 5500)}, and NVR={1, 3, 5}, where NVR(0)=1 to indicate that the first vibration range is the starting vibration range to be used with the first audio channel, NVR(1)=3 to indicate that the third vibration range is the starting vibration range for the second audio channel, and NVR(2)=5=N1+1 to complete the testing of vibration ranges. In some embodiments, the VR( ) array can include a sensor number, name, or other identifier to indicate which sensor is associated with a frequency range. For example, again using the data from chart 500, the VR( ) array can include sensor names such as VR={(accelerometer, 20, 60), (BCM, 330, 5000), (accelerometer, 20, 60), (BCM, 5000, 5500)}. Other examples are possible as well.

Method 520 begins at block 522 where correlation delays between microphone(s) used for the audio channel and other sensor(s) used for the vibration channel(s) can be determined, if necessary. Correlation delays may have to be determined on a per HMD basis, periodically in time, and/or on some other basis (e.g., at the start of each session of speech). In some other scenarios, correlation delays may be roughly constant and thus can be determined once and stored for reuse.

Also at block 522, frequency ranges AR(1:N) for the audio channel, frequency ranges VR(1:N1), and corresponding counts NVR(0:N) for the vibration channel can be determined.

At block 530, new audio data can be received from the audio channel and new vibration data can be received from the vibration channels. The variable i, which indexes the audio channel frequency ranges, can be set to 0. The variable j, which indexes the audio channel frequency ranges, can be set to NVR(i). A Boolean value OLDSPEAK, which indicates whether or not the previous iteration has seen coherent data in a speech band, can be initialized to the value of a Boolean value SPEAK, which indicates whether or not the current iteration has seen coherent data in a speech band. SPEAK can be then initialized to NO.

Method 520 can determine that a speaker is speaking based on the value of SPEAK for all audio channel frequency ranges tested during a current iteration of method 520 through the audio channel frequency ranges, and the value of OLD-SPEAK for audio channel frequency ranges tested during a previous iteration of method 520 through the audio channel frequency ranges At block 532, the value of i is compared to N, which is the number of audio channel frequency ranges. If i is greater than or equal to N, then all audio channels have been tested for this iteration of method 520 through the audio channel frequency ranges, and method 520 can proceed to block 530. Otherwise, i is less than N, and method 520 can proceed to block 534.

In some embodiments not shown in FIG. 5B, after determining i is greater than or equal to N, a determination can be made as to whether or not processing for method 520 is complete. If the processing for method 520 is complete, method 500 ends. Otherwise, method 520 can proceed to block 530.

At block 534, i, which is the audio channel frequency range index, is incremented; that is, the value of i is increased by one.

At block 540, an "audio range" AR(i) or frequency range for the audio channel and a "vibration range" VR(j) or frequency range for the vibration channel can be selected. If audio range AR(i) is a speech band, set the variable SB to 1 (indicating frequency range AR(i) is a speech band), otherwise set SB to 0 (indicating frequency range AR(i) is not a speech band).

In scenarios where all audio channel frequency ranges are speech bands, such as shown in chart 500 of FIG. 5A, method 520 can be simplified by: (i) removing the variable SB, (ii) removing the test to determine whether AR(i) is a speech band from step 540, (iii) removing blocks 580 and 582, and (iv) changing the "Yes" branch of block 570 to proceed to block 584.

At block 550, a determination is made as to whether there is data in the audio channel within audio range AR(i). If there is no data in the audio channel within audio range AR(i), method 520 can proceed to block 572, while if there is data in the audio channel within audio range AR(i), method 520 can proceed to block 560.

At block 560, a determination is made as to whether there is data in the vibration channel within vibration range VR(j). This determination can be made after taking any correlation delay(s) between the audio channel and the vibration channel. If there is no data in the vibration channel within vibration range VR(j), method 520 can proceed to block 572, while if there is data in the vibration channel within vibration range VR(j), method 520 can proceed to block 560.

At block 570, a determination is made as to whether there is coherent data between the audio range AR(i) of the audio channel and the vibration range VR(j) of the vibration channel. This determination can be made for spectral coherency, perhaps based on a threshold degree of spectral coherency as discussed above. If there is coherent data between the audio channel in the AR(i) audio range and the vibration channel in the VR(j) vibration range, method 520 can proceed to block 580; otherwise, method 520 can proceed to block 572.

At block 572, audio range AR(i) of the audio channel and/or vibration range VR(j) of the vibration channel can be conditioned as non-speech data. As one simple example, the audio data in audio range AR(i) and/or the vibration data in vibration range VR(j) can be allowed to pass unchanged. As another example, the audio channel can be filtered to diminish, mask, and/or remove the speech data in audio range AR(i) and/or the vibration channel can be filtered to diminish, mask, and/or remove the vibration data in vibration range VR(j). As another example, the speech data in audio range AR(i) and/or vibration data in vibration range VR(j) can be replaced with data representing background noise in the same frequency range(s). Other examples of conditioning non-speech data are possible as well.

At block 580, a determination is made as to whether the variable SB equals one; that is, whether or not audio range AR(i) is a speech band. If SB does not equal one, method 520 can proceed to block 582; else SB does equal one and method 520 can proceed to block 584.

At block 582, audio range AR(i) of the audio channel and/or vibration range VR(j) of the vibration channel can be conditioned as coherent non-speech data. For example, some or the entire example conditioning techniques discussed in the context of block 572 can be used on audio data in audio range AR(i) of the audio channel and/or vibration data in vibration range VR(j) of the vibration channel. As another example, the audio channel can be filtered to amplify the audio data in frequency range AR(i) and/or the vibration channel can be filtered to amplify the vibration data in frequency range VR(j). Other examples of conditioning coherent non-speech data are possible as well.

At block 584, audio range AR(i) of the audio channel and/or vibration range VR(j) of the vibration channel can be conditioned as coherent speech bands. As one simple example, the audio data in audio range AR(i) and/or the vibration data in vibration range VR(j) can be allowed to pass unchanged. As another example, the audio channel can be filtered to amplify the audio data in frequency range AR(i) and/or the vibration channel can be filtered to amplify the vibration data in frequency range VR(j). Other examples of conditioning coherent speech data are possible as well.

In some embodiments, at least audio data within audio range AR(i) of the audio channel and/or vibration data within vibration range VR(j) of the vibration channel can be provided as input(s) from the speaker for recognition, perhaps by an ASR process, such as discussed above in detail in the context of FIG. 4.

At block 586, j, which is the vibration channel frequency range index, is incremented; that is, the value of j is increased by one.

At block 588, a determination is made as to whether or not j is greater than or equal to the count NVR(i). If j is less than NVR(i), then at least one additional vibration channel for audio range AR(i) remains to be processed and method 520 can proceed to block 540. If j is greater than or equal to NVR(i), all vibration channels for audio range AR(i) have been processed and method 520 can proceed to block 532.

Example Systems and Devices

Systems and devices in which example embodiments may be implemented will now be described in greater detail. In general, an example system may be implemented in or may take the form of a wearable computer. However, an example system may also be implemented in or take the form of other devices, such as a mobile phone, among others. Further, an example system may take the form of non-transitory computer readable medium, which has program instructions stored thereon that are executable by at a processor to provide the functionality described herein. An example, system may also take the form of a device such as a wearable computer or mobile phone, or a subsystem of such a device, which includes such a non-transitory computer readable medium having such program instructions stored thereon.

Figure 6A:
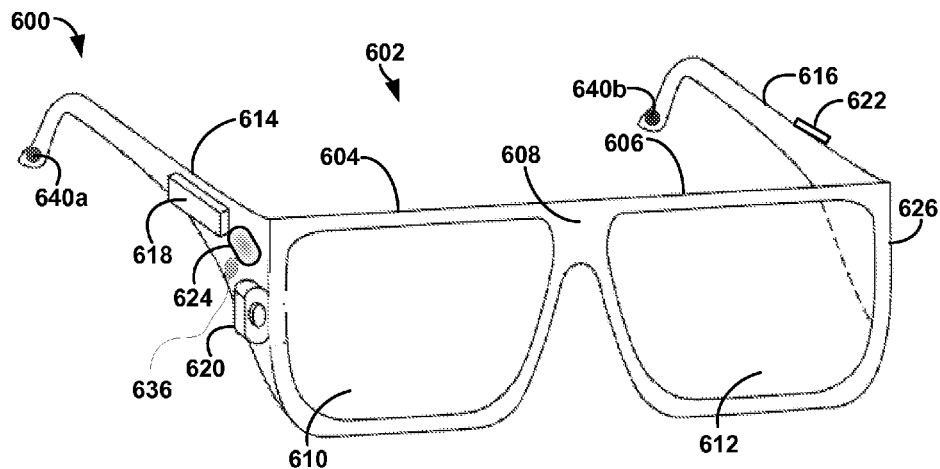
FIGS. 6A and 6B illustrate a wearable computing device (WCD), according to an example embodiment.
Figure 6B:
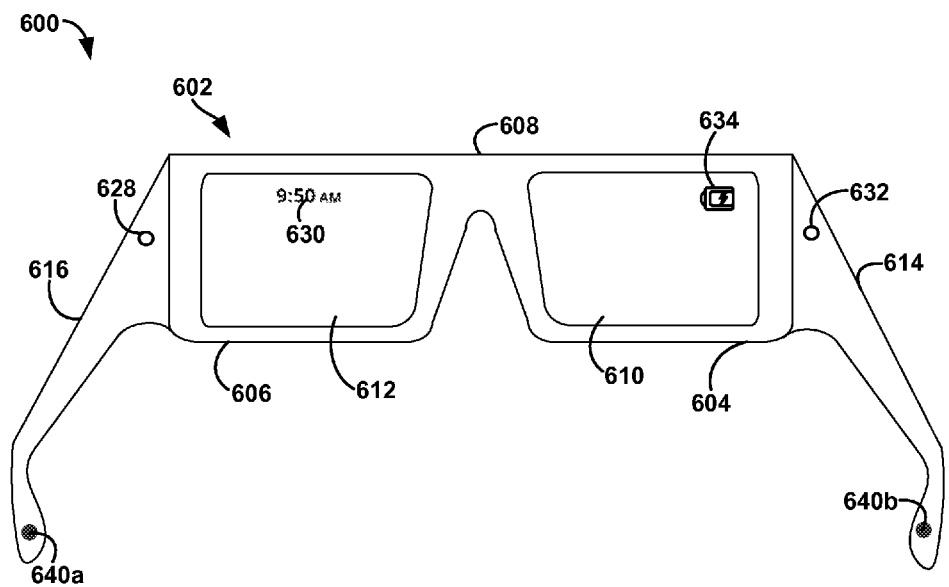

FIGS. 6A and 6B illustrate a wearable computing device 600, according to an example embodiment. In FIG. 6A, the wearable computing device 600 takes the form of a head-mountable device (HMD) 602. It should be understood, however, that example systems and devices may take the form of or be implemented within or in association with other types of devices, without departing from the scope of the invention.

As illustrated in FIG. 6A, the head-mountable device 602 comprises frame elements including lens-frames 604 and 606 and a center frame support 608, lens elements 610 and 612, and extending side-arms 614 and 616. The center frame support 608 and the extending side-arms 614 and 616 are configured to secure the head-mountable device 602 to a wearer's face via a wearer's nose and ears, respectively.

Each of the frame elements 604, 606, and 608 and the extending side-arms 614 and 616 may be formed of a solid structure of plastic or metal, or may be formed of a hollow structure of similar material so as to allow wiring and component interconnects to be internally routed through the head-mountable device 602. Other materials may possibly be used as well.

One or both of lens elements 610 and 612 may be formed of any material that can suitably display a projected image or graphic. One or both of lens elements 610 and 612 may also be sufficiently transparent to allow a wearer to see through the lens element. Combining these two features of lens elements 610, 612 can facilitate an augmented reality or heads-up display where the projected image or graphic is superimposed over a real-world view as perceived by the wearer through the lens elements.

The extending side-arms 614 and 616 each may be projections that extend away from the frame elements 604 and 606, respectively, and are positioned behind a wearer's ears to secure the head-mountable device 602. The extending side-arms 614 and 616 may further secure the head-mountable device 602 to the wearer by extending around a rear portion of the wearer's head. Additionally or alternatively, for example, head-mountable device 602 may connect to or be affixed within a head-mounted helmet structure. Other possibilities exist as well.

Head-mountable device 602 may also include an on-board computing system 618, video camera 620, sensor 622, finger-operable touchpads 624, 626, and microphone 636. The on-board computing system 618 is shown on the extending side-arm 614 of the head-mountable device 602; however, the on-board computing system 618 may be positioned on other parts of the head-mountable device 602 or may be remote from head-mountable device 602; e.g., the on-board computing system 618 could be wired to or wirelessly-connected to the head-mounted device 602.

The on-board computing system 618 may include a processor and memory, for example. The on-board computing system 618 may be configured to receive and analyze data from video camera 620, sensor 622, and the finger-operable touchpads 624, 626 (and possibly from other sensory devices, user interfaces, or both) and generate images for output from the lens elements 610 and 612 and/or other devices.

The sensor 622 is shown mounted on the extending side-arm 616 of the head-mountable device 602; however, the sensor 622 may be provided on other parts of the head-mountable device 602. The sensor 622 may include one or more of a gyroscope or an accelerometer, for example. Other sensing devices may be included within the sensor 622 or other sensing functions may be performed by the sensor 622.

In an example embodiment, sensors such as sensor 622 may be configured to detect head movement and/or speech-related vibrations by a wearer of head-mountable device 602. For instance, a gyroscope and/or accelerometer may be arranged to detect head movements, including jaw movements, and/or other speech-related vibrations, and may be configured to output head-movement and/or vibration data. The gyroscope and accelerometer can be configured to generate respective gyroscopic data and acceleration data with respect to one, two, three, or more axes. This head-movement and/or vibration data may then be used to carry out functions of an example method, such as method 100, 400, and/or 520, for instance, such as discussed below in the context of FIG. 6C.

The finger-operable touchpads 624, 626 are shown mounted on the extending side-arms 614, 616 of the head-mountable device 602. Each of finger-operable touchpads 624, 626 may be used by a wearer to input commands. The finger-operable touchpads 624, 626 may sense at least one of a position and a movement of a finger via capacitive sensing, resistance sensing, or a surface acoustic wave process, among other possibilities. The finger-operable touchpads 624, 626 may be capable of sensing finger movement in a direction parallel or planar to the pad surface, in a direction normal to the pad surface, or both, and may also be capable of sensing a level of pressure applied. The finger-operable touchpads 624, 626 may be formed of one or more transparent or transparent insulating layers and one or more transparent or transparent conducting layers. Edges of the finger-operable touchpads 624, 626 may be formed to have a raised, indented, or roughened surface, so as to provide tactile feedback to a wearer when the wearer's finger reaches the edge of the finger-operable touchpads 624, 626. Each of the finger-operable touchpads 624, 626 may be operated independently, and may provide a different function.

Microphone 636 can be configured to capture audio data, such as but not limited to speech data. The speech data can be captured in one or more frequency bands related to speech. In other embodiments, head-mountable device 602 can be configured with more or fewer microphones 636 and/or microphone(s) 636 can be mounted at other location(s) of head-mountable device 602.

BCMs 640a, 640b are shown in FIGS. 6A and 6B as black circles mounted in respective portions of extending side-arms 614, 616 that can be positioned behind a wearer's ears to secure the head-mountable device 602. At those positions, BCMs 640a, 640b can make good contact with a bone, such a skull of a wearer of wearable computing device 602, and thus be able to receive vibrations and/or sounds via bone conduction and correspondingly generate vibration and/or sound data. The vibration data can be in one or more frequency ranges related to vibration data and/or sound data captured by BCMs 640a, 640b. In some embodiments, head-mountable device 602 can be configured with more or fewer BCMs 640a, 640b and/or bone-BCMs 640a, 640b can be mounted at other location(s) of head-mountable device 602. In other embodiments, other sensors such as magnetometer(s) can accompany and/or replace BCMs 640a, 640b and/or some or all components of sensor 622.

FIG. 6B illustrates an alternate view of the wearable computing device shown in FIG. 6A. As shown in FIG. 6B, the lens elements 610 and 612 may act as display elements. The head-mountable device 602 may include a first projector 628 coupled to an inside surface of the extending side-arm 616 and configured to project a display 630 onto an inside surface of the lens element 612. Additionally or alternatively, a second projector 632 may be coupled to an inside surface of the extending side-arm 614 and configured to project a display 634 onto an inside surface of the lens element 610.

The lens elements 610 and 612 may act as a combiner in a light projection system and may include a coating that reflects the light projected onto them from the projectors 628 and 632. In some embodiments, a special coating may be omitted (e.g., when the projectors 628 and 632 are scanning laser devices).

In alternative embodiments, other types of display elements may also be used. For example, the lens elements 610, 612 themselves may include: a transparent or semi-transparent matrix display, such as an electroluminescent display or a liquid crystal display, one or more waveguides for delivering an image to the wearer, or other optical elements capable of delivering an in focus near-to-eye image to the wearer. A corresponding display driver may be disposed within the frame elements 604 and 606 for driving such a matrix display. Alternatively or additionally, a laser or light-emitting diode (LED) source and scanning system could be used to draw a raster display directly onto the retina of one or more of the wearer's eyes. Other possibilities exist as well.

While FIGS. 6A and 6B show two touchpads and two display elements, it should be understood that many example methods and systems may be implemented in wearable computing devices with only one touchpad and/or with only one lens element having a display element. It is also possible that example methods and systems may be implemented in wearable computing devices with more than two touchpads.

The outward-facing video camera 620 is shown to be positioned on the extending side-arm 614 of the head-mountable device 602; however, the outward-facing video camera 620 may be provided on other parts of the head-mountable device 602. The outward-facing video camera 620 may be configured to capture images at various resolutions or at different frame rates. Many video cameras with a small form-factor, such as those used in cell phones or webcams, for example, may be incorporated into an example of wearable computing device 600.

Although FIG. 6A illustrates one outward-facing video camera 620, more outward-facing video cameras may be used than shown in FIG. 6A, and each outward-facing video camera may be configured to capture the same view, or to capture different views. For example, the outward-facing video camera 620 may be forward facing to capture at least a portion of the real-world view perceived by the wearer. This forward facing image captured by the outward-facing video camera 620 may then be used to generate an augmented reality where computer generated images appear to interact with the real-world view perceived by the wearer.

Figure 6C:
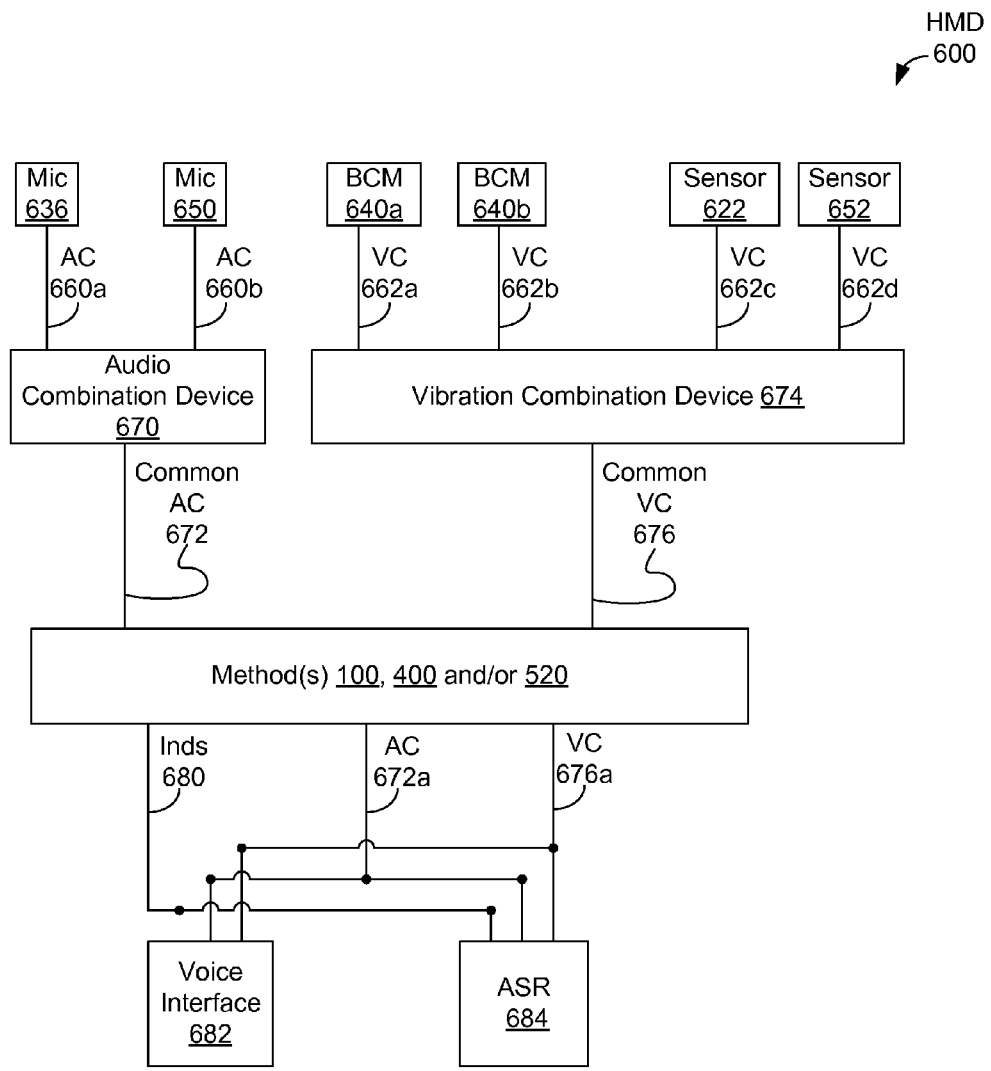
FIG. 6C shows a block diagram of an HMD configured to provide audio and/or vibration channels to a voice interface and/or automatic speech recognition process, according to an example embodiment.

FIG. 6C shows a block diagram of HMD 600 configured to provide audio and/or vibration channels to voice interface 682 and/or ASR process 684, according to an example embodiment. Microphones 636 and 650 of HMD 600 can be configured to provide audio data in respective audio channels (ACs) 660a and 660b. In some embodiments, one or more than two microphones, and corresponding audio channels can be utilized by HMD 600.

BCMs 640a, 640b can be each configured to provide vibration data in respective vibration channels (VCs) 662a, 662b. In some embodiments, more or fewer than two BCMs and corresponding vibration channels can be utilized by HMD 600. Sensors 622, 652 each can be one or more accelerometers, gyroscopes, and/or other sensor(s) that are configured to provide vibration data in respective VCs 662c, 662d. In some embodiments, more or fewer than two sensors and corresponding vibration channels can be utilized by HMD 600.

In some embodiments, ACs 660a, 660b can be combined into a common AC 672 by an audio combination device 670. Examples of audio combination device 670 and/or vibration combination device 674 include but are not limited to a mixer, a diplexer, a triplexer, a starpoint combiner, a manifold combiner, a stretchline combiner, a filter combiner, a multiplexer, an audio combiner, and combinations thereof. Similarly, in some embodiments, VCs 662a, 662b, 662c, 662d can be combined into a common VC 676 by a vibration combination device 674. In still other embodiments, functionality for audio combination device 670 and vibration combination device 674 can be performed by more or fewer than two devices. In even other embodiments, HMD 600 is not configured with audio combination device 670 and/or vibration combination device 674.

AC 672 and VC 676 can be provided to software and/or hardware of HMD 600 configured to perform the functionality of herein-described methods 100, 400, and/or 520. For example, memory and/or other data storage of HMD 600 can store instructions that, if executed by a processor of HMD 600 can be configured to cause HMD 600 to perform some or all of the herein-described techniques of methods 100, 400, and/or 520. As a result, HMD 600 can generate or otherwise provide AC 672a, VC 676a, and indications 680. AC 672a can be a copy of input AC 672 or can be a conditioned audio channel, as discussed above in the context of FIG. 5A. Similarly, VC 676a can be a copy of input VC 676 or can be a conditioned vibration channel, as discussed above in the context of FIG. 5A. Indications 680 can be indications and/or signals whether or not an HMD-wearer is speaking, such as discussed above in the context of methods 100, 400, and 520.

AC 672a, VC 676a, and indications 680 can be passed to both voice interface 682 and ASR process 684 of HMD 600. Voice interface 682 can use indications 680 to determine whether to activate and/or deactivate voice interface 682. When voice interface 682 is activated, audio data from AC 672a and perhaps vibration data from VC 676a can be provided to a speech recognizer, such as ASR process 684, to recognize speech in the audio data and/or vibration data, and to provide text corresponding to the recognized speech to a command execution system (not shown in FIG. 6C) of HMD 600 to execute command(s) in the recognized speech.

ASR process 684 can attempt to recognize speech in the audio data of AC 672a. In some embodiments, ASR process 684 can attempt to recognize speech in both the audio data of AC 672a and the vibration data of VC 676a. For example, vibration data can include information about tones not typically provided as audio data, such as very low and very high frequency data. In still other embodiments, ASR process 684 can use vibration data of VC 676a and/or indications 680 to activate itself, such as discussed for voice interface 682. In particular embodiments, ASR process 684 can be "always on"; then, vibration data of VC 676a and/or indications 680 can be used to start and/or stop examining audio data and/or vibration data for speech to be recognized.

Figure 7:
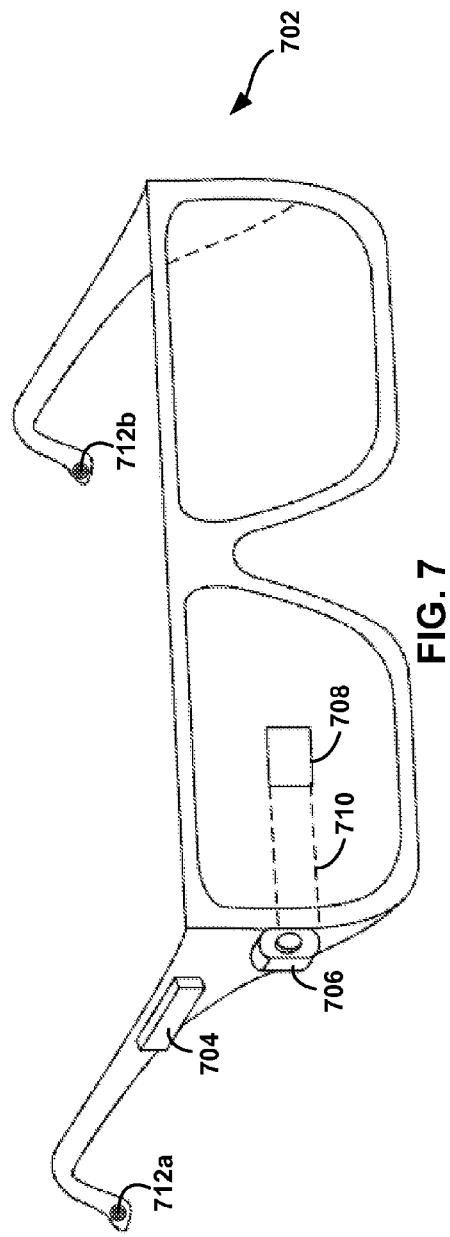
FIG. 7 illustrates another wearable computing device, according to an example embodiment.

FIG. 7 illustrates another wearable computing device, according to an example embodiment, which takes the form of head-mountable device 702. Head-mountable device 702 may include frame elements, side-arms, and bone conducting microphones 712a, 712b such as those described with respect to FIGS. 6A and 6B. Head-mountable device 702 may additionally include an on-board computing system 704 and video camera 706, such as described with respect to FIGS. 6A and 6B. Video camera 706 is shown mounted on a frame of head-mountable device 702. However, video camera 706 may be mounted at other positions as well.

As shown in FIG. 7, head-mountable device 702 may include display 708 which may be coupled to a wearable computing device. Display 708 may be formed on one of the lens elements of head-mountable device 702, such as a lens element described with respect to FIGS. 6A and 6B, and may be configured to overlay computer-generated graphics on the wearer's view of the physical world.

Display 708 is shown to be provided in a center of a lens of head-mountable device 702; however, the display 708 may be provided in other positions. The display 708 can be controlled using on-board computing system 704 coupled to display 708 via an optical waveguide 710.

Figure 8:
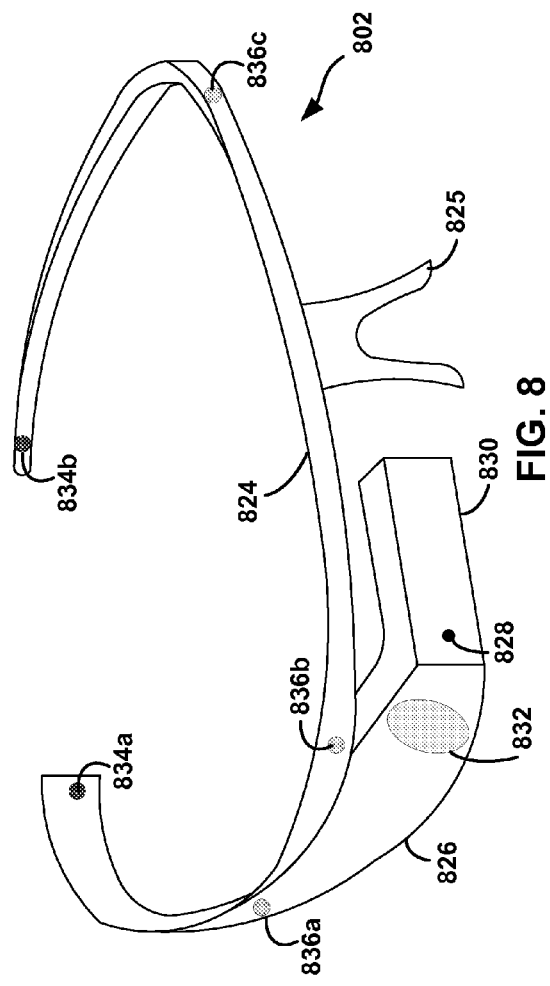
FIG. 8 illustrates yet another wearable computing device, according to an example embodiment.

FIG. 8 illustrates yet another wearable computing device, according to an example embodiment, which takes the form of head-mountable device 802. Head-mountable device 802 can be in the form of a band 824 and nosepiece 825. As shown in FIG. 8, head-mountable device 802 does not include lens-frames containing lens elements.

Head-mountable device 802 may additionally include an on-board computing system 826, video camera 828, microphone 832, BCMs 834a, 834b, and sensors, such as gyroscopes, magnetometers, and/or accelerometers 836a, 836b, and 836c, and such as described with respect to FIGS. 6A and 6B. In some embodiments, head-mountable device 802 may include more or fewer computing system(s), video camera(s), microphone(s), BCM(s), and/or sensors than shown in FIG. 8.

Head-mountable device 802 may include a single lens element 830 configured to be coupled to band 824. The lens element 830 may include a display such as the display described with reference to FIGS. 6A and 6B, and may be configured to overlay computer-generated graphics upon the wearer's view of the physical world. In one example, the single lens element 830 may be coupled to the inner side (i.e., the side exposed to a portion of a wearer's head when worn by the wearer) of band 824. The single lens element 830 may be positioned in front of or proximate to a wearer's eye when head-mountable device 802 is worn. For example, the single lens element 830 may be positioned below the band 824, as shown in FIG. 8.

Figure 9:
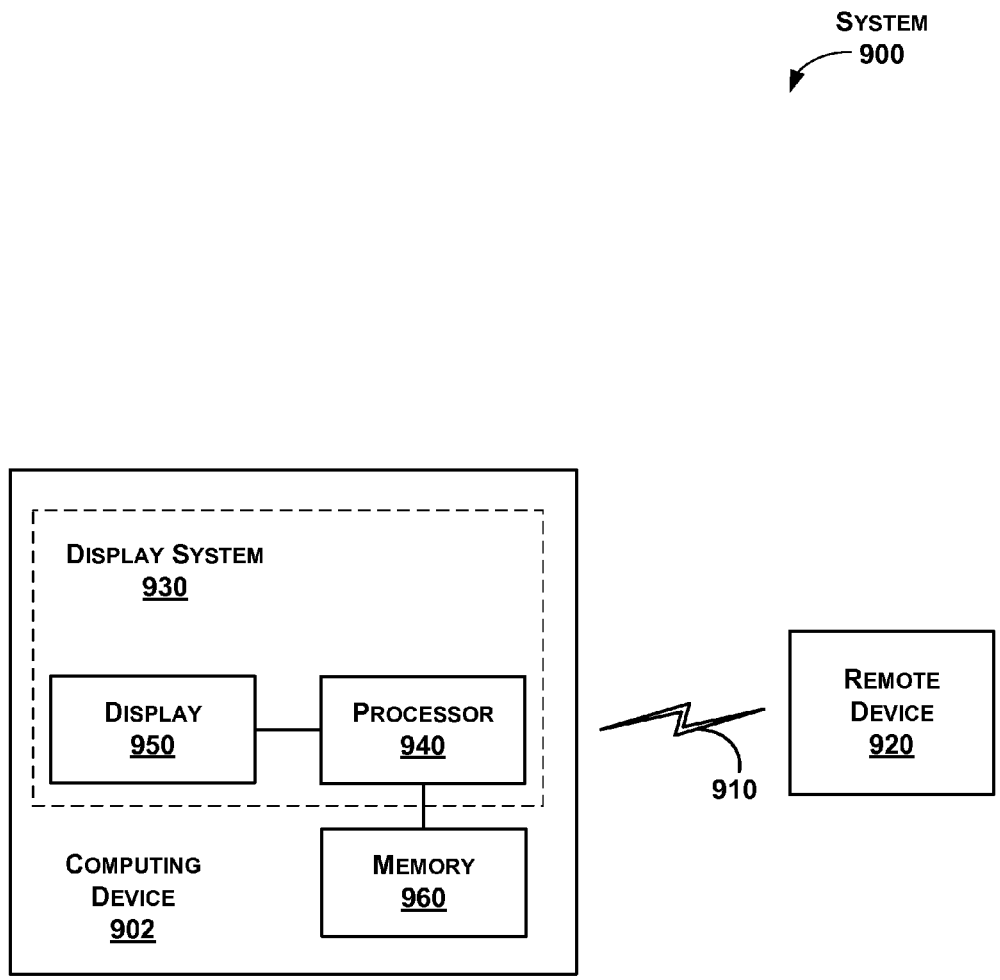
FIG. 9 illustrates an example schematic drawing of a computer network infrastructure in which an example embodiment may be implemented.

FIG. 9 illustrates a schematic drawing of a computing system 900 according to an example embodiment. In system 900, a computing device 902 communicates using a communication link 910 (e.g., a wired or wireless connection) to a remote device 920. Computing device 902 may be any type of device that can receive data and display information corresponding to or associated with the data. For example, the device 902 may be associated with and/or be part or all of a heads-up display system, such as one or more of the head-mountable devices 200, 602, 702, and 802 described above with reference to FIGS. 2-8.

Thus, computing device 902 may include display system 930, processor 940, and display 950. Display 950 may be, for example, an optical see-through display, an optical see-around display, or a video see-through display. Processor 940 may receive data from remote device 920 and configure the data for display on display 950. Processor 940 may be any type of processor, such as a micro-processor or a digital signal processor, for example.

Computing device 902 may further include on-board data storage, such as memory 960 coupled to the processor 940. Memory 960 may store software that can be accessed and executed by the processor 940. For example, memory 960 may store software that, if executed by processor 940 is configured to perform some or all of the functionality described herein, for example.

Remote device 920 may be any type of computing device or transmitter including a laptop computer, a mobile telephone, or tablet computing device, etc., that is configured to transmit and/or receive data to/from computing device 902. Remote device 920 and computing device 902 may contain hardware to establish, maintain, and tear down communication link 910, such as processors, transmitters, receivers, antennas, etc.

In FIG. 9, communication link 910 is illustrated as a wireless connection; however, communication link 910 can also or instead include wired connection(s). For example, the communication link 910 may include a wired serial bus such as a universal serial bus or a parallel bus. A wired connection may be a proprietary connection as well. The communication link 910 may also include a wireless connection using, e.g., Bluetooth® radio technology, communication protocols described in IEEE 802.11 (including any IEEE 802.11 revisions), cellular technology (such as GSM, CDMA, UMTS, EV-DO, WiMAX, or LTE), or Zigbee® technology, among other possibilities. Computing device 902 and/or remote device 920 may be accessible via the Internet and may include a computing cluster associated with a particular web service (e.g., social-networking, photo sharing, address book, etc.).

CONCLUSION

Example methods and systems are described herein. The example embodiments described herein are not meant to be limiting. It will be readily understood that certain aspects of the disclosed systems and methods can be arranged and combined in a wide variety of different configurations, all of which are contemplated herein.

The above detailed description describes various features and functions of the disclosed systems, devices, and methods with reference to the accompanying figures. In the figures, similar symbols typically identify similar components, unless context dictates otherwise. The illustrative embodiments described in the detailed description, figures, and claims are not meant to be limiting. Other embodiments can be utilized, and other changes can be made, without departing from the spirit or scope of the subject matter presented herein. It will be readily understood that the aspects of the present disclosure, as generally described herein, and illustrated in the figures, can be arranged, substituted, combined, separated, and designed in a wide variety of different configurations, all of which are explicitly contemplated herein.

With respect to any or all of the ladder diagrams, scenarios, and flow charts in the figures and as discussed herein, each block and/or communication may represent a processing of information and/or a transmission of information in accordance with example embodiments. Alternative embodiments are included within the scope of these example embodiments. In these alternative embodiments, for example, functions described as blocks, transmissions, communications, requests, responses, and/or messages may be executed out of order from that shown or discussed, including substantially concurrent or in reverse order, depending on the functionality involved. Further, more or fewer blocks and/or functions may be used with any of the ladder diagrams, scenarios, and flow charts discussed herein, and these ladder diagrams, scenarios, and flow charts may be combined with one another, in part or in whole.

A block that represents a processing of information may correspond to circuitry that can be configured to perform the specific logical functions of a herein-described method or technique. Alternatively or additionally, a block that represents a processing of information may correspond to a module, a segment, or a portion of program code (including related data). The program code may include one or more instructions executable by a processor for implementing specific logical functions or actions in the method or technique. The program code and/or related data may be stored on any type of computer readable medium such as a storage device including a disk or hard drive or other storage medium.

The computer readable medium may also include non-transitory computer readable media such as computer-readable media that stores data for short periods of time like register memory, processor cache, and random access memory (RAM). The computer readable media may also include non-transitory computer readable media that stores program code and/or data for longer periods of time, such as secondary or persistent long term storage, like read only memory (ROM), optical or magnetic disks, compact-disc read only memory (CD-ROM), for example. The computer readable media may also be any other volatile or non-volatile storage systems. A computer readable medium may be considered a computer readable storage medium, for example, or a tangible storage device.

Moreover, a block that represents one or more information transmissions may correspond to information transmissions between software and/or hardware modules in the same physical device. However, other information transmissions may be between software modules and/or hardware modules in different physical devices.

While various aspects and embodiments have been disclosed herein, other aspects and embodiments will be apparent to those skilled in the art. The various aspects and embodiments disclosed herein are for purposes of illustration and are not intended to be limiting, with the true scope and spirit being indicated by the following claims.

The invention claimed is:

1. A method, comprising:
    receiving audio data representative of audio detected by a microphone, wherein the microphone is positioned on a head-mountable device (HMD);
    determining whether the received audio data comprises audio speech data in an audio-channel speech band or audio non-speech data outside the audio-channel speech band;
    receiving vibration data representative of vibrations detected by a sensor other than the microphone, wherein the sensor is positioned on the HMD;
    determining a degree of spectral coherency, with respect to a threshold, between the audio data and the vibration data;
    determining whether or not the audio data is causally related to the vibration data based on the determined degree of spectral coherency; and
    if the received audio data both: (a) comprises audio speech data in an audio-channel speech band and (b) is determined to be causally related to the vibration data based on the degree of spectral coherency, then generating an indication that the audio data contains HMD-wearer speech and conditioning at least one of the audio data and the vibration data as speech data, wherein the conditioning comprises amplifying at least one of the audio data and the vibration data;

if the received audio data both: (a) comprises audio non-speech data outside the audio-channel speech band and (b) is determined to be causally related to the vibration data based on the degree of spectral coherency, then conditioning at least one of the audio data and the vibration data as coherent non-speech data, wherein the conditioning comprises removing or replacing non-speech data from at least one of the audio data and the vibration data; and otherwise, determining that the received audio data and the vibration data are non-coherent and conditioning at least one of the audio data and the vibration data as non-speech data, wherein the conditioning comprises removing or replacing non-speech data from at least one of the audio data and the vibration data.

2. The method of claim 1, further comprising:
determining a correlation delay between the microphone and the sensor.

3. The method of claim 1, further comprising:
in response to determining that the audio speech data is causally related to the vibration speech data, providing at least the audio speech data to a speech recognizer.

4. The method of claim 1, further comprising:
in response to determining that the audio speech data is causally related to the vibration speech data, providing the audio speech data and the vibration speech data to a speech recognizer.

5. The method of claim 4, further comprising:
recognizing text corresponding to the HMD-wearer speech in the audio speech data and the vibration speech data using the speech recognizer.

6. The method of claim 1, wherein the sensor comprises a bone-conducting microphone (BCM) and/or an accelerometer.

7. The method of claim 1, further comprising:
in response to determining that the audio speech data is causally related to the vibration speech data, conditioning the audio data and/or vibration data as speech.

8. A head-mountable device (HMD), comprising:
a processor;
a microphone;
a sensor;
a non-transitory computer-readable medium; and
program instructions stored on the non-transitory computer-readable medium, wherein the program instructions are executable by the processor to cause the HMD to perform functions comprising:
receiving audio data representative of audio detected by the microphone;
determining whether the received audio data comprises audio speech data in an audio-channel speech band or audio non-speech data outside the audio-channel speech band;
receiving vibration data representative of vibrations detected by the sensor;
determining a degree of spectral coherency, with respect to a threshold, between the audio data and the vibration data;
determining whether or not the audio data is causally related to the vibration data based on the determined degree of spectral coherency; and if the received audio data both: (a) comprises audio speech data in an audio-channel speech band and (b) is determined to be causally related to the vibration data based on the degree of spectral coherency, then generating an indication that the audio data contains HMD-wearer speech and conditioning at least one of the audio data and the vibration data as speech data, wherein the conditioning comprises amplifying at least one of the audio data and the vibration;

if the received audio data both: (a) comprises audio non-speech data outside the audio-channel speech band and (b) is determined to be causally related to the vibration data based on the degree of spectral coherency, then conditioning at least one of the audio data and the vibration data as coherent non-speech data, wherein the conditioning comprises removing or replacing non-speech data from at least one of the audio data and the vibration data; and otherwise, determining that the received audio data and the vibration data are non-coherent and conditioning at least one of the audio data and the vibration data as non-speech data, wherein the conditioning comprises removing or replacing non-speech data from at least one of the audio data and the vibration data.

9. The HMD of claim 8, wherein the functions further comprise:
determining a correlation delay between the microphone and the sensor.

10. The HMD of claim 8, wherein the functions further comprise:
in response to determining that the audio speech data is causally related to the vibration speech data, providing at least the audio speech data to a speech recognizer.

11. The HMD of claim 8, wherein the functions further comprise:
in response to determining that the audio speech data is causally related to the vibration speech data, providing the audio speech data and the vibration speech data to a speech recognizer.

12. The HMD of claim 11, wherein the functions further comprise:
recognizing text corresponding to the HMD-wearer speech in the audio speech data and the vibration speech data using the speech recognizer.

13. The HMD of claim 8, wherein the sensor comprises a bone-conducting microphone (BCM) and/or an accelerometer.

14. The HMD of claim 8, wherein the functions further comprise:
in response to determining that the audio speech data is causally related to the vibration speech data, conditioning the audio data and/or vibration data as speech.

15. An article of manufacture including a non-transitory computer-readable medium having instructions stored thereon that, when executed by a computing device, cause the computing device to perform functions comprising:
receiving audio data representative of audio detected by a microphone, wherein the microphone is positioned on a head-mountable device (HMD);
determining whether the received audio data comprises audio speech data in an audio-channel speech band or audio non-speech data outside the audio-channel speech band;
receiving vibration data representative of vibrations detected by a sensor other than the microphone, wherein the sensor is positioned on the HMD;

determining a degree of spectral coherency, with respect to a threshold, between the audio data and the vibration data;

determining whether or not the audio data is causally related to the vibration data based on the determined degree of spectral coherency; and if the received audio data both: (a) comprises audio speech data in an audio-channel speech band and (b) is determined to be causally related to the vibration data based on the degree of spectral coherency, then generating an indication that the audio data contains HMD-wearer speech and conditioning at least one of the audio data and the vibration data as speech data, wherein the conditioning comprises amplifying at least one of the audio data and the vibration;

if the received audio data both: (a) comprises audio non-speech data outside the audio-channel speech band and (b) is determined to be causally related to the vibration data based on the degree of spectral coherency, then conditioning at least one of the audio data and the vibration data as coherent non-speech data, wherein the conditioning comprises removing or replacing non-speech data from at least one of the audio data and the vibration data; and otherwise, determining that the received audio data and the vibration data are non-coherent and conditioning at least one of the audio data and the vibration data as non-speech data, wherein the conditioning comprises removing or replacing non-speech data from at least one of the audio data and the vibration data.

16. The article of manufacture of claim 15, wherein the functions further comprise:
  determining a correlation delay between the microphone and the sensor.

17. The article of manufacture of claim 15, wherein the functions further comprise:
  in response to determining that the audio speech data is causally related to the vibration speech data, providing the audio speech data and/or the vibration speech data to a speech recognizer.

18. The article of manufacture of claim 17, wherein the functions further comprise:
  recognizing text corresponding to the HMD-wearer speech in the audio speech data and the vibration speech data using the speech recognizer.

19. The article of manufacture of claim 15, wherein the sensor comprises an accelerometer and/or a bone-conducting microphone (BCM).

20. The article of manufacture of claim 15, wherein the functions further comprise:
  in response to determining that the audio speech data is causally related to the vibration speech data, conditioning the audio data and/or vibration data as speech.

* * * * *